United States Patent [19]

Okano

[11] Patent Number: 5,560,698
[45] Date of Patent: Oct. 1, 1996

[54] LIGHTING APPARATUS AND LIQUID CRYSTAL DISPLAY DEVICE USING THE SAME

[75] Inventor: Masanobu Okano, Yamabe-gun, Japan

[73] Assignee: Sharp Kabushiki Kaisha, Osaka, Japan

[21] Appl. No.: 310,327

[22] Filed: Sep. 22, 1994

[30] Foreign Application Priority Data

Sep. 30, 1993 [JP] Japan .................................. 5-245081

[51] Int. Cl.$^6$ .................................................. F21V 8/00
[52] U.S. Cl. .............. 362/31; 362/26; 362/223; 362/348
[58] Field of Search .................. 362/31, 26, 223, 362/342, 346, 348; 40/546

[56] References Cited

U.S. PATENT DOCUMENTS

| | | | |
|---|---|---|---|
| 5,262,928 | 11/1993 | Kashima et al. | 362/26 |
| 5,363,294 | 11/1994 | Yamamoto et al. | 362/26 |
| 5,410,454 | 4/1995 | Murase et al. | 362/26 |
| 5,467,417 | 11/1995 | Nakamura et al. | 362/26 |

FOREIGN PATENT DOCUMENTS

| | | |
|---|---|---|
| 4-66519 | 10/1992 | Japan . |
| 5-134231 | 5/1993 | Japan . |

*Primary Examiner*—Denise L. Gromada
*Assistant Examiner*—Alfred Basichas
*Attorney, Agent, or Firm*—Birch, Stewart, Kolasch & Birch, LLP

[57] ABSTRACT

The lighting apparatus including a cathode tube, a photoconductive member to which light from the cathode tube is conducted through an edge surface thereof, and reflecting means for reflecting the light from the cathode tube toward the edge surface of the photoconductive member. The reflecting means has on the inner surface thereof reflecting mirrors which are made of silver and arranged at uniform intervals. With this structure, even when the reflecting means and the cathode tube are disposed close to each other, it is possible to prevent a leakage current from flowing from the cathode tube to the reflecting mirrors because the reflecting surfaces are separated from each other. This stops the leakage current from lowering a driving current of the cathode tube, and it is therefore possible to maintain high light emitting efficiency in the cathode tube. Moreover, since silver is used for the reflecting surfaces, reflecting efficiency of the reflecting means is maintained. The lighting apparatus can thus have a reduced thickness, more compact size, and improved surface brightness.

11 Claims, 4 Drawing Sheets

LIGHTING APPARATUS AND LIQUID CRYSTAL DISPLAY DEVICE USING THE SAME

FIELD OF THE INVENTION

The present invention relates to a lighting apparatus for illuminating, for example, a liquid crystal display panel from behind, and a liquid crystal display device using the lighting apparatus as a backlight.

BACKGROUND OF THE INVENTION

As for a surface light source, an edge lighting type lighting apparatus is usually used. As illustrated in FIG. 7, the edge lighting type lighting apparatus includes a cathode tube 31, a reflecting section 32, and a photoconductive member 33. The cathode tube 31 is a thin tube type linear light source and driven by a high frequency current generated by a high voltage. The photoconductive member 33 is a light transmitting plate, and converts light emitted from the cathode tube 31 into a surface light source when the cathode tube 31 is disposed adjacent to an edge surface 34a thereof. The reflecting section 32 covers the cathode tube 31 so that the light from the cathode tube 31 is efficiently reflected and guided to the photoconductive member 33.

The photoconductive member 33 has a transparent resin plate 34 with good light transmitting properties, for example, made of an acrylic resin. Irregular reflection surfaces 35 in the form of dots are formed on the rear surface of the transparent resin plate 34 by screen printing, for example. A reflecting plate 36 made of a white polyester film is laminated to cover the irregular reflection surfaces 35. The irregular reflection surfaces 35 and the reflecting plate 36 constitute a reflecting member of the surface light source.

Also formed on the front surface of the transparent resin plate 34 is a diffusion resin sheet 37 for evenly diffusing light which has been reflected by the reflecting plate 36 and passed through the transparent resin plate 34. Such a structure provides the photoconductive member 33 capable of converting a linear light source into a surface light source.

In order to efficiently conducting light emitted from the surface of the cathode tube 31 to an edge surface 34 of the transparent resin plate 34, a reflecting section 32 positioned along the periphery of the cathode tube 31 includes a base material 39 and a reflecting surface 38. The reflecting surface 38 is a metal mirror and formed on the inner surface of the base material 39.

As to the reflecting section 32, in order to achieve efficient reflection, the reflecting surface 38 is formed by uninterruptedly and evenly depositing a metal thin film such as silver and aluminum on the surface of the base material 39 made of, for example, a polyester film by vacuum evaporation.

As to the reflecting surface 38, it is generally known that a metal thin film made of silver reflects light most efficiently, and therefore silver is often used as material for the reflecting surface 38. However, when the reflecting surface 38 is formed by silver, decreasing the thickness of the lighting apparatus is prevented by the following problems.

The cathode tube 31 is turned on by a high frequency current generated by a high voltage. However, when the reflecting surface 38 is formed by silver on the reflecting section 32, if the reflecting section 32 is positioned close to the cathode tube 31 to reduce the thickness of the lighting apparatus, part of a current which should flow to the cathode tube 31 is caused to flow as a leakage current to the reflecting surface 38 due to an electrostatic capacity between the cathode tube 31 and the reflecting surface 38. Consequently, an amount of current which should flow to the cathode tube 31 can not be ensured due to the leakage current, thereby decreasing the brightness of the lighting apparatus.

In order to prevent such a leakage current, the following methods have been used. More specifically, Japanese Publication for Examined Patent Application No. 66519/1992 discloses the formation of a reflecting surface by a white foaming resin surface. Japanese Publication for Unexamined Patent Application No. 134231/1993 discloses the use of a surface of a molded article formed by plastics of high reflectivity by extrusion molding as a reflecting surface.

These methods prevent the leakage current by removing the reflecting surface 38 as a metal conducting member disposed close to the cathode tube 31 and using as an insulating member a foaming resin sheet or a white surface of a plastic molded article having high reflectivity for the reflecting surface.

However, since the reflecting surfaces disclosed in the above-mentioned publications are made of foaming sheets or plastics of high reflectivity, they are inferior to a reflecting surface made of silver in terms of reflecting efficiency.

More specifically, according to the data obtained by the present inventor through comparisons between the reflecting surfaces of the above-mentioned publications and the reflecting surface made of silver, it is confirmed that the reflecting surfaces of the above-mentioned publications lower the surface brightness by about 5 to 20 %.

In short, although the conventional lighting apparatuses prevent a leakage current, they eventually cause a lowering of surface brightness due to the lowered reflecting efficiency.

When a liquid crystal display device incorporates such a lighting apparatus as a backlight, it is difficult to achieve a reduction in the thickness and power consumption and to obtain sufficient brightness.

SUMMARY OF THE INVENTION

It is an object of the present invention to provide a lighting apparatus capable of preventing a leakage current and improving surface brightness while maintaining high reflecting efficiency.

Another object of the present invention is to provide a thin liquid crystal display device achieving low power consumption and high brightness using the above lighting apparatus.

A lighting apparatus of the present invention includes a light transmitting plate-like photoconductive member for emitting light from a surface thereof, a linear light source, disposed along an edge surface of the photoconductive member, for emitting light toward the edge surface, and reflecting means for reflecting the light from the linear light source toward the edge surface, wherein the reflecting means has a reflecting surface which is formed by arranging a plurality of metal mirrors as discrete areas on a surface of an electrically insulating material.

With this structure, the reflecting surface of the reflecting means for reflecting the light emitted by the linear light source is not a smooth uninterrupted surface of metal, but is formed by partially arranging mirrors on the surface of an insulating member metal as discrete areas, for example, as a pattern of dots, strips, or squares. Namely, the metal mirrors are electrically insulated from each other and a flow of electricity is cut off.

It is therefore possible to prevent a leakage current from the linear light source from flowing to the metal mirrors even when the linear light source and the reflecting means are disposed close to each other. This prevents the leakage current from decreasing a driving current of the linear light source. In short, even when the linear light source and the reflecting means are disposed close to each other, the brightness of the linear light source is not decreased by the metal mirrors.

Since the light from the linear light source is reflected by the metal mirror made of, for example, silver or aluminum having high reflectivity, the efficiency of using light is improved compared with the case where a white resin surface is used as the reflecting surface.

Since a leakage current is prevented and light is used highly efficiently even when the thickness and size of the lighting apparatus are reduced by disposing the linear light source and the reflecting means close to each other, it is possible to prevent a lowering of the surface brightness of the photoconductive member.

A liquid crystal display device of the present invention includes such a lighting apparatus on the rear surface of a liquid crystal display panel as a backlight.

This structure enables a thinner and more compact light apparatus without lowering the surface brightness. Namely, when the lighting apparatus is used as a backlight, a thinner and more compact liquid crystal display device achieving lowered power consumption and high brightness is provided.

For a fuller understanding of the nature and advantages of the invention, reference should be made to the ensuing detailed description taken in conjunction with the accompanying drawings.

DESCRIPTION OF THE PREFERRED EMBODIMENTS

The following description discusses one embodiment of the present invention with reference to FIGS. 1 to 6.

Figure 2:
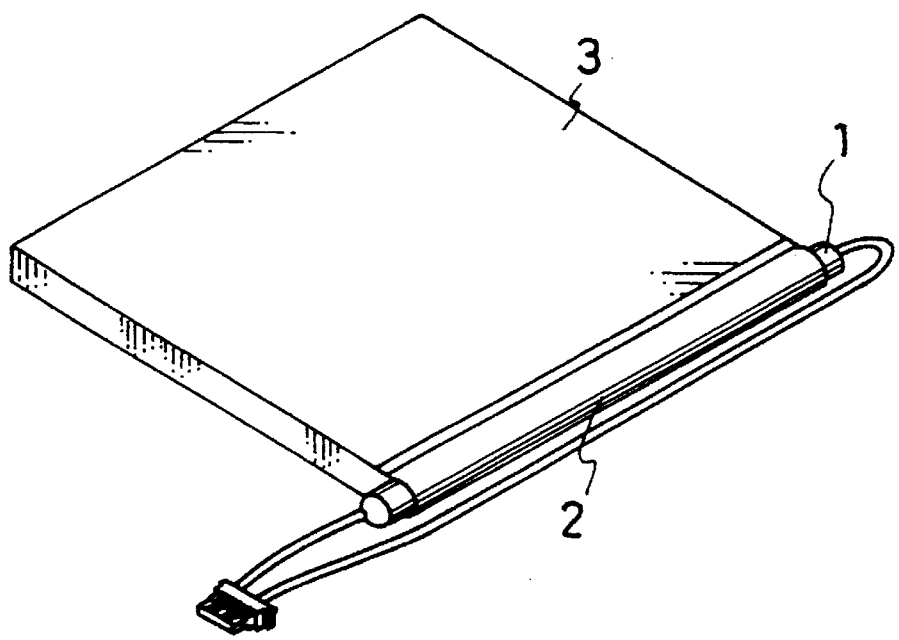
FIG. 2 is a perspective view of the lighting apparatus.

As illustrated in FIG. 2, a lighting apparatus of this embodiment is an edge lighting type surface light source including a cathode tube 1 as a linear light source, reflecting means 2, and a plate-like photoconductive member 3.

The cathode tube 1 is mounted along one of the edge surfaces 12a of the photoconductive member 3, and emits light when driven by a high-frequency current of a high voltage and illuminates the entire edge surface 12a.

The reflecting means 2 has a curved surface to cover the cathode tube 1 so that light emitted by the cathode tube 1 is efficiently reflected toward the edge surface 12a of the photoconductive member 3. Accordingly, the reflecting means 2 is mounted on the photoconductive member 3 along the edge surface 12a thereof.

The rays of light which are emitted by the cathode tube 1 and then reflected by the reflecting means 2 enter the edge surface 12a of the photoconductive member 3. The entered light passes through the photoconductive member 3 and is evenly emitted from the entire front surface of the photoconductive member 3. In this specification, a surface of the photoconductive member 3 opposite the front surface thereof is referred to as a rear surface of the photoconductive member 3.

Figure 1:
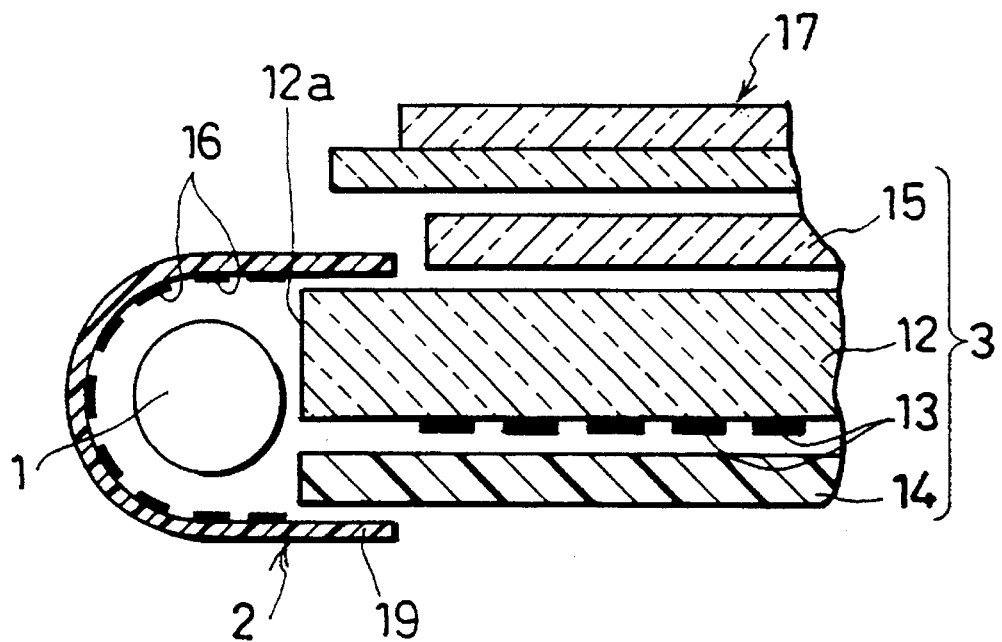
FIG. 1 is a cross section of essential part of a lighting apparatus and a liquid crystal display device according to one embodiment of the present invention.

For example, as shown in FIG. 1, such a lighting apparatus is used as a backlight for a liquid crystal display device. In this case, the lighting apparatus is mounted on the rear surface of a liquid crystal display panel 17 and substantially evenly illuminates the entire rear surface of the liquid crystal display panel 17. In this specification, the rear surface of the liquid crystal display panel 17 is a surface opposite a display surface thereof.

In the lighting apparatus, the photoconductive member 3 includes a transparent resin plate 12 having good light transmitting properties, for example, made of acrylic resin. The transparent resin plate 12 is disposed such that one of its edge surfaces 12a is located close to the cathode tube 1.

Irregular reflection surfaces 13 in the form of dots are formed on the rear surface of the transparent resin plate 12 by screen printing, for example. A reflecting plate 14 made of, for example, a white polyester film is laminated to cover the irregular reflection surfaces 13. The irregular reflection surfaces 13 and the reflecting plate 14 constitute a reflecting member of the surface light source of the photoconductive member 3.

Formed on the front surface of the transparent resin plate 12 is a diffusion resin sheet 15 for evenly diffusing light which has been reflected by the reflecting plate 14 and passed through the transparent resin plate 12 in an upward direction. Namely, the transparent resin plate 12, the irregular reflecting surfaces 13, the reflecting plate 14 and the diffusion resin sheet 15 constitute the photoconductive member 3 for converting a linear light source into a surface light source.

In order to efficiently guiding light emitted from the surface of the cathode tube 1 to the edge surface 12a of the transparent resin plate 12, the reflecting means 2 which curves along the external surface of the cathode tube 1 is disposed with a predetermined interval from the cathode tube 1. The reflecting means 2 includes a base material (insulating material) 19 formed by an electrically insulating white plastic material with high reflectivity.

Silver reflecting surfaces (metal mirrors) 16 are formed at predetermined intervals on an inner surface of the base material 19 as follows.

Figure 3:
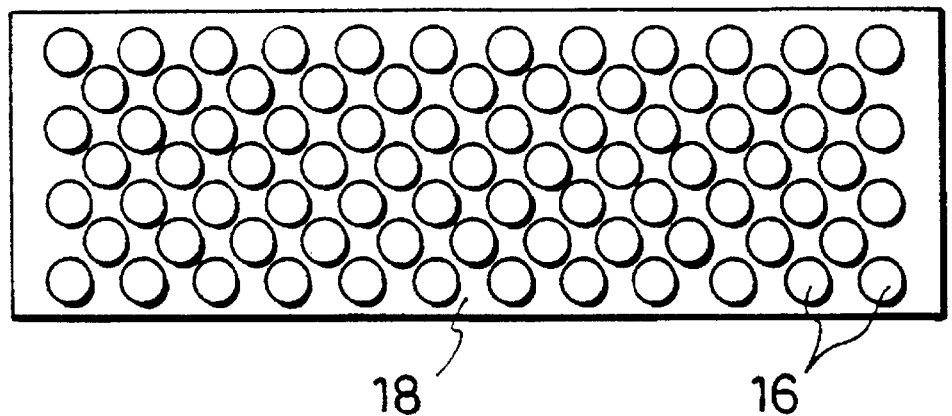
FIG. 3 is a plan view showing a film patterned with silver reflecting surfaces which is to be placed on the reflecting means of the lighting apparatus.

As illustrated in FIG. 3, the silver reflecting surfaces 16 are patterned to be discrete areas by depositing at predetermined intervals silver in the shape of circles with a predetermined diameter on a transparent film 18. For example, PET (polyethylene terephthalate) is a suitable material for the film 18.

By in-molding the film 18 patterned with the silver reflecting surfaces 16 using the plastic material of high reflectivity, the silver reflecting surfaces 16 are formed on the inner surface of the base material 19 made of plastic material of high reflectivity. Consequently, the reflecting means 2 having the silver reflecting surfaces 16 formed partially, i.e., at predetermined intervals on the inner surface of the base material 19 is obtained.

As to the pattern of the silver reflecting surfaces 16, the silver reflecting surfaces 16 need to form discrete areas on the surface of the film 18. However, the silver reflecting surfaces 16 are not necessarily be circular in shape (see FIG. 3).

Figure 4:
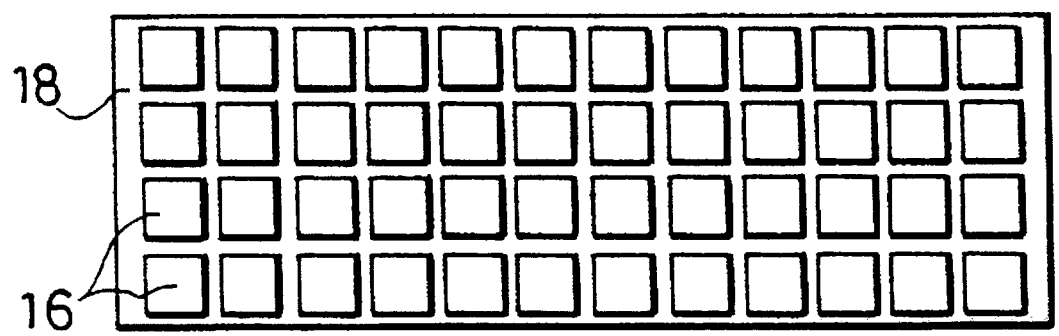
FIG. 4 is a plan view showing a film patterned with silver reflecting surfaces different from that of FIG. 3.
Figure 5:
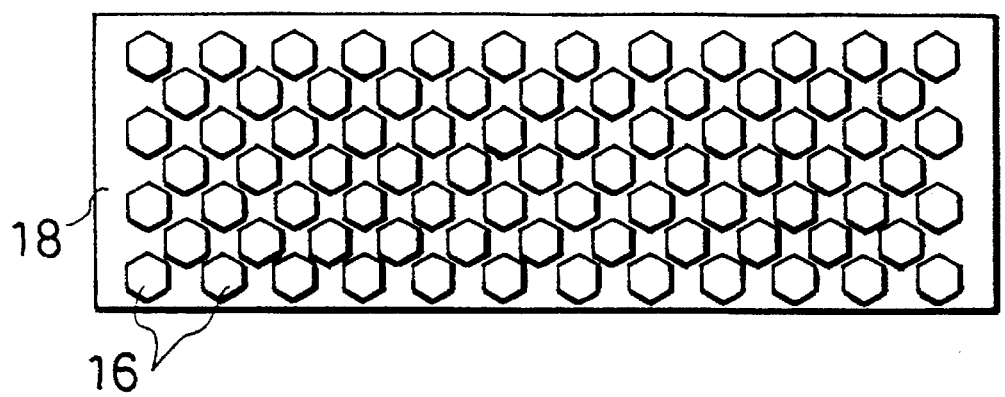
FIG. 5 is a plan view showing a film patterned with silver reflecting surfaces different from that of FIG. 3.
Figure 6:
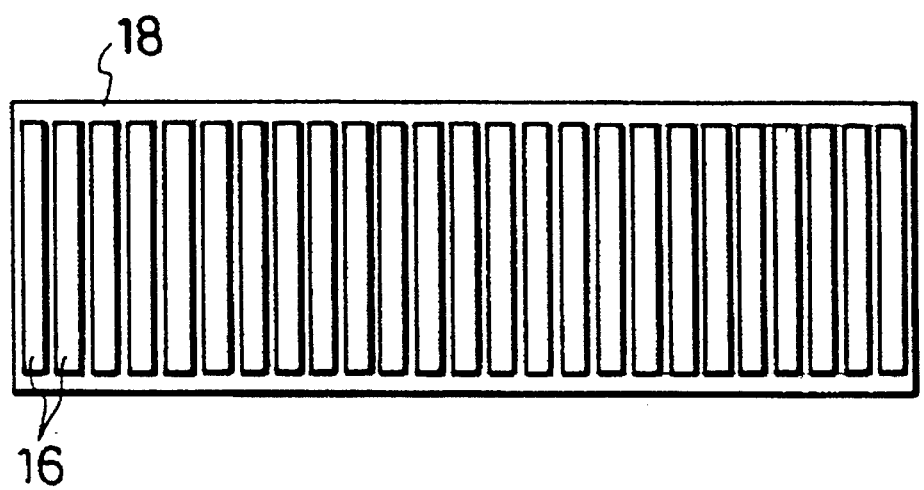
FIG. 6 is a plan view showing a film patterned with silver reflecting surfaces different from that of FIG. 3.
Figure 7:
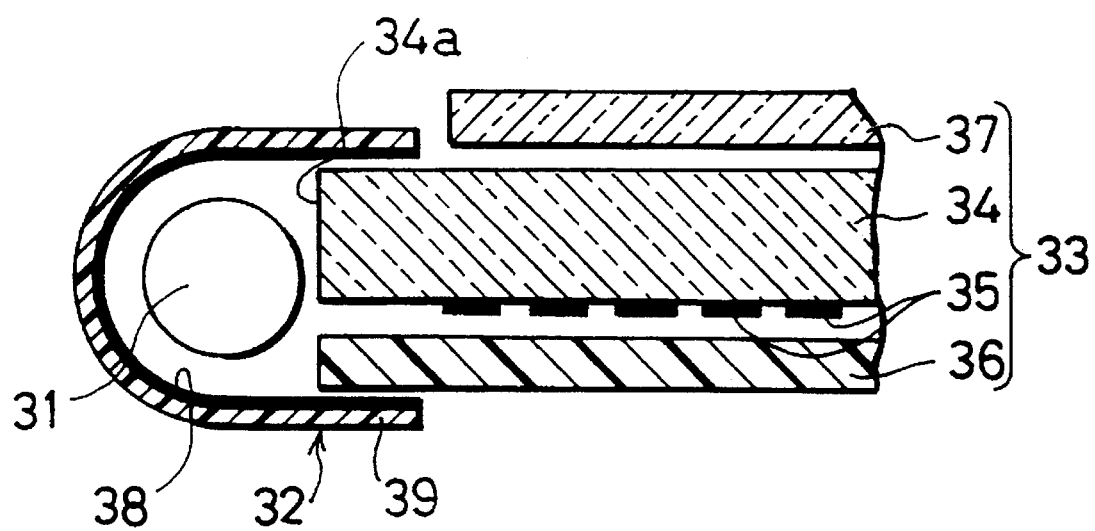
FIG. 7 is a cross section of a conventional lighting apparatus.

For instance, when forming the silver reflecting surfaces 16 as dots, the dots may be formed, for example, in the shape of square as shown in FIG. 4 or hexagon as shown in FIG. 5. It is also possible form the silver reflecting surfaces 16 in the pattern of vertical stripes separated by uniform space along the axis direction of the cathode tube 1. It is also possible to form metal mirrors using aluminum in a similar manner.

With the above-mentioned structure, the light from the cathode tube 1 enters the photoconductive member 3 through the edge surface 12a of the transparent resin plate 12. This light includes light emitted toward the edge surface 12a of the transparent resin plate 12 and light which has been emitted from the cathode tube 1 and reflected by the inner surface of the reflecting means 2 toward the edge surface 12a.

The light which has entered the transparent resin plate 12 is emitted from the whole front surface of the transparent resin plate 12 by the irregular reflecting surfaces 13 and the reflecting plate 14. Subsequently, the light is evenly applied to the entire rear surface of the liquid crystal display panel 17 through the diffusion resin sheet 15.

When reflecting the light toward the photoconductive member 3 by the reflecting means 2, most portions of the light emitted by the cathode tube 1 are reflected toward the edge surface 12a by the silver reflecting surfaces 16. Additionally, since the base material 19 is formed by plastic material of high reflectivity, even when the light which falls upon an area of the inner surface of the reflecting means 2 where the silver reflecting surfaces 16 are not formed, it is reflected by the base material 19 toward the edge surface 12a.

The silver reflecting surfaces 16 are formed as discrete areas on the inner surface of the base material 19 as an electrically insulating member. Namely the silver reflecting surfaces 16 are formed at predetermined intervals, and the electrically insulating base material 19 and the film 18 exist between the silver reflecting surfaces 16. Since the silver reflecting surfaces 16 are insulated from each other, a flow of a current between the silver reflecting surfaces 16 is prevented.

Therefore, even when a sufficient space is not ensured between the cathode tube 1 and the reflecting means 2, it is possible to prevent a current, which should flow to the cathode tube 1, from flowing as a leakage current to the silver reflecting surfaces 16. This prevents a leakage current from lowering a driving current of the cathode tube 1 and decreasing the light amount of the cathode tube 1.

The light from the cathode tube 1 is reflected mainly by the silver reflecting surfaces 16. This structure overcomes the problem of a conventional structure, i.e., when the entire inner surface of the reflecting means is formed by plastics of high reflectivity or a white foaming resin sheet, the reflecting efficiency is lowered. It is thus possible to efficiently reflect the light from the cathode tube 1 toward the photoconductive member 3 and to improve the surface brightness.

As a result, in the lighting apparatus of this embodiment, even when the cathode tube 1 and the reflecting means 2 are disposed close to each other, a leakage current from the cathode tube 1 is prevented, and the reflecting means 2 maintains high reflecting efficiency. It is thus possible to improve the surface brightness of the photoconductive member 3 while reducing the thickness and the size of the apparatus.

Moreover, reducing the thickness and the size is available as the lighting apparatus of the above-mentioned structure is capable of preventing leakage of a driving current of the cathode tube 1. It is therefore possible to provide a thinner and more compact liquid crystal display panel 17 capable of achieving higher brightness and lowered power consumption by using the lighting apparatus as a backlight.

It is also possible to use a white foaming resin sheet having light reflecting properties instead of the base material 19. In this case, the reflecting means 2 is formed by patterning the surface of the foaming resin sheet with the silver reflecting surfaces 16 of a predetermined shape at predetermined intervals. Namely, the reflecting means 2 is a flexible film member. Such reflecting means 2 is also applicable to the present invention, and produces effects similar to those mentioned above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting apparatus comprising:
    a light transmitting plate-like photoconductive member for emitting light from a surface thereof;
    a linear light source, disposed along an edge surface of said photoconductive member, for emitting light toward the edge surface; and
    reflecting means for reflecting the light from said linear light source toward the edge surface,
    wherein said reflecting means has a reflecting surface which is formed by arranging a plurality of metal mirrors as discrete areas on a surface of an electrically insulating material.

2. The lighting apparatus according to claim 1, wherein said linear light source is a cathode tube driven by a high frequency current generated by a high voltage.

3. The lighting apparatus according to claim 1, wherein a surface of said insulating material on which said metal mirrors are formed is made of a white foaming resin sheet having light reflecting properties.

4. The lighting apparatus according to claim 1, wherein said reflecting means is a molded article which is produced from a plastic material with high reflectivity and has said metal mirrors as discrete areas on a surface thereof.

5. The lighting apparatus according to claim 1, wherein said metal mirrors are circular in shape and arranged at uniform intervals.

6. The lighting apparatus according to claim 1, wherein said metal mirrors are rectangular in shape and arranged at uniform intervals.

7. The lighting apparatus according to claim 1, wherein said metal mirrors are hexagonal in shape and arranged at uniform intervals.

8. The lighting apparatus according to claim 1, wherein said metal mirrors are formed into strips and aligned in parallel at uniform intervals.

9. The lighting apparatus according to claim 8,
wherein said metal mirrors are aligned in a direction substantially orthogonal to an axis direction of said linear light source so that said metal mirrors are arranged along a peripheral of said linear light source.

10. The lighting apparatus according to claim 1,
wherein said metal mirrors are formed by a silver-deposited film.

11. A liquid crystal display device comprising:

a liquid crystal display panel for displaying an image by shutting and passing light; and a lighting apparatus, mounted on a rear surface of said liquid crystal display panel, for evenly applying light to the rear surface thereof, wherein said lighting apparatus includes:

a plate-like photoconductive member having light transmitting properties for emitting light from a surface thereof;

a linear light source for emitting light toward an edge surface of said photoconductive member; and reflecting means for reflecting the light from said linear light source toward the edge surface of said photoconductive member, said reflecting means having a reflecting surface formed by arranging a plurality of metal mirrors as discrete areas on a surface of an electrically insulating material.

* * * * *